United States Patent [19]

Hannecart et al.

[11] Patent Number: 5,286,413
[45] Date of Patent: Feb. 15, 1994

[54] MIXTURES OF POLAR POLYMERS AND DEDOPED CONDUCTIVE POLYMERS, PROCESSES FOR OBTAINING THESE MIXTURES AND USE OF THESE MIXTURES TO PRODUCE ELECTRONIC, OPTOELECTRICAL, ELECTRICAL AND ELECTROMECHANICAL DEVICES

[75] Inventors: Etienne Hannecart, Tervuren; Claude Franquinet, Brussels, both of Belgium

[73] Assignee: Solvay & Cie (Societe Anonyme), Brussels, Belgium

[21] Appl. No.: 747,374

[22] Filed: Aug. 20, 1991

[30] Foreign Application Priority Data

Aug. 30, 1990 [BE] Belgium .............................. 09000838

[51] Int. Cl.$^5$ .......................... H01B 1/00; H01B 1/20
[52] U.S. Cl. .................................. 252/500; 252/518; 525/471; 526/258; 526/285; 528/226; 528/228; 528/266; 528/423; 548/469; 564/305
[58] Field of Search ............... 252/500, 518; 528/423, 528/226, 228, 266; 525/471; 548/469; 526/285; 564/305

[56] References Cited

U.S. PATENT DOCUMENTS 4,731,754  3/1988  Ogden et al. ...................... 365/121

FOREIGN PATENT DOCUMENTS 9109715  7/1991  France .
9109715  7/1991  France .

OTHER PUBLICATIONS

WPIL, File Supplier, Derwent Publications Ltd., London, GB; AN=86-192278 & JP-A-61123637 (Teijin KK.) Nov. 6, 1986.

Primary Examiner—Mark L. Bell
Assistant Examiner—Deborah Jones
Attorney, Agent, or Firm—Spencer, Frank & Schneider

[57] ABSTRACT

A polymer mixture, including at least one conductive polymer which has been dedoped to provide at least one dedoped conductive polymer; and at least one polar polymer. The polymer mixture has outstanding dielectric properties so that the polymer mixture is useful for producing electronic, optoelectrical, electrical and electromechanical devices.

12 Claims, 3 Drawing Sheets

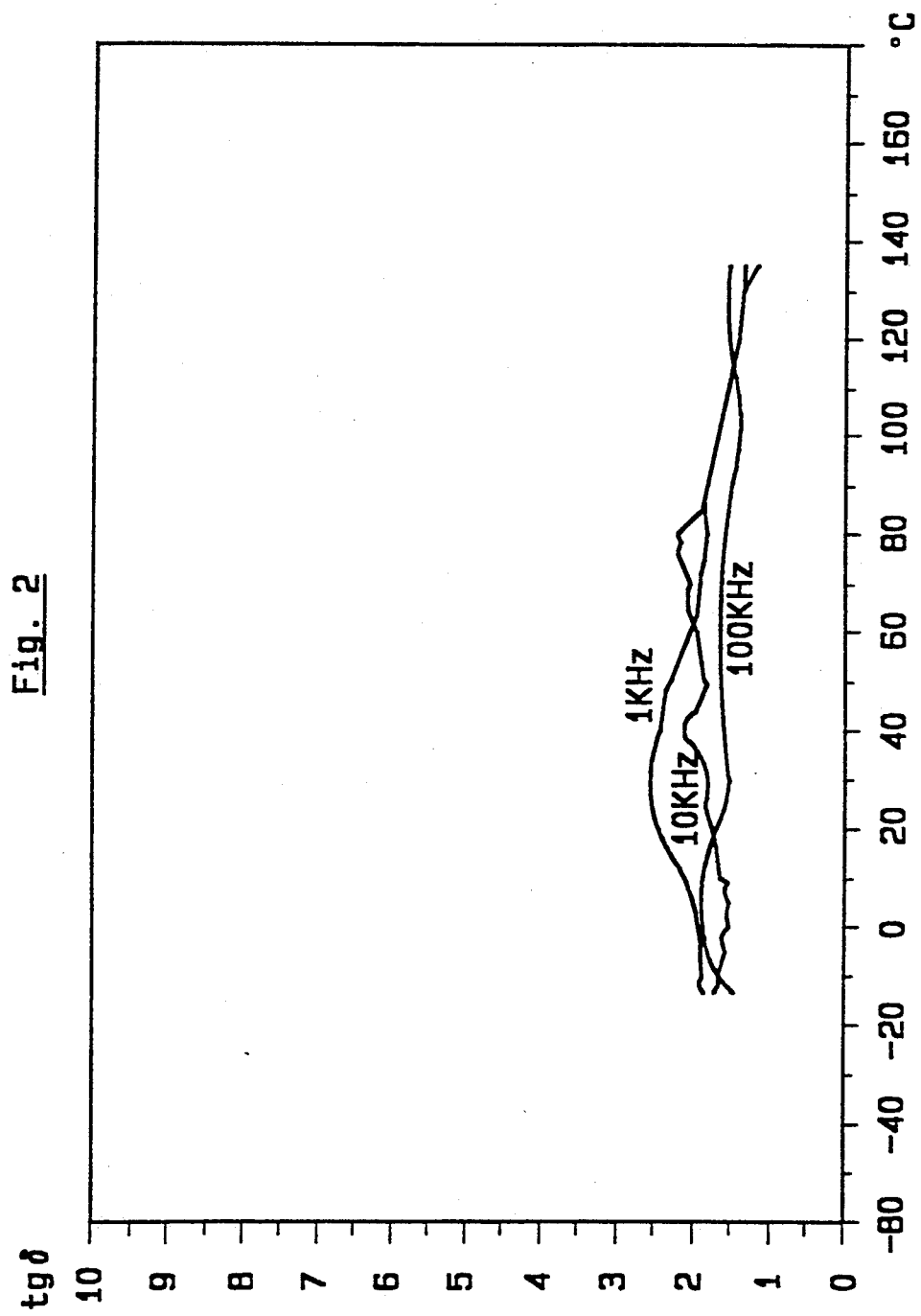

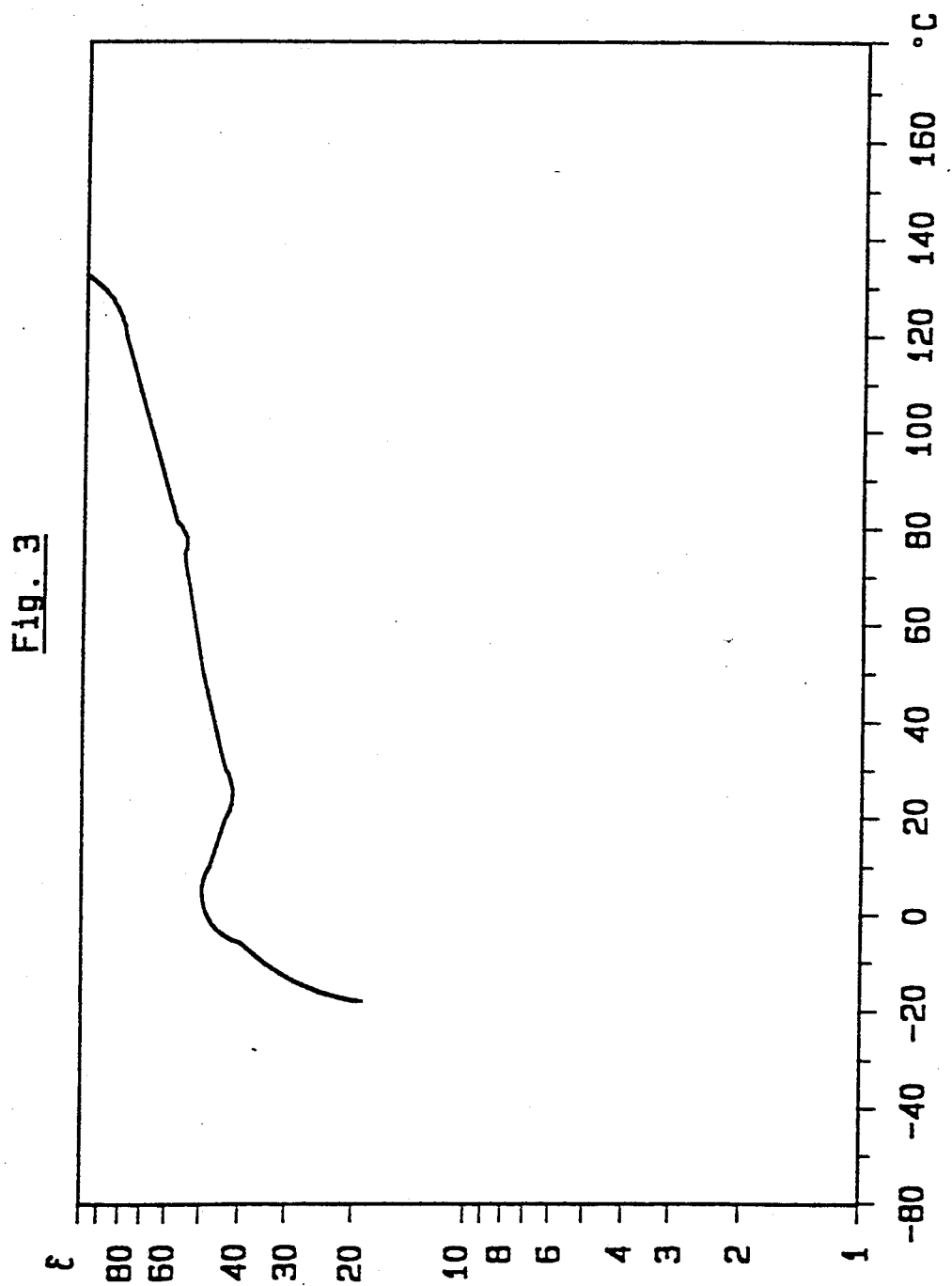

MIXTURES OF POLAR POLYMERS AND DEDOPED CONDUCTIVE POLYMERS, PROCESSES FOR OBTAINING THESE MIXTURES AND USE OF THESE MIXTURES TO PRODUCE ELECTRONIC, OPTOELECTRICAL, ELECTRICAL AND ELECTROMECHANICAL DEVICES

BACKGROUND OF THE INVENTION

1. Field of the Invention

The present invention relates to mixtures of polymers comprising, on the one hand, polar polymers such as conventional fluorinated polymers, in particular homopolymers or copolymers of vinylidene fluoride, and, on the other hand, polarisable polymers belonging to the category of polymers which are termed "conductive" but are dedoped, to processes for obtaining such mixtures and to their use in electronic, optoelectrical and electrical and electromechanical devices.

2. Description of the Related Art

Currently there are some polymers, such as the polyacetylenes, polypyrroles, polyindoles, polyphenylenes and polythiophenes, which when they are obtained by an electrochemical route or a chemical route in the presence of specific chemical agents, termed dopants, have conductivity properties, which is why these polymers have some applications in particular as energy storage devices (accumulators, rechargeable batteries, capacitors, . . . ) or as electrochromic devices or as devices which are effectly conductors depending on the redox state in which they exist.

When these polymers are subjected to a dedoping operation, these "conductor" polymers lose their conductive properties and become, just as the conventional polymers, non-conductive polymers. This property has apparently never led to any particular industrial use because it is of no immediate value owing to the fact that the conventional polymers are already insulating products and may be obtained under economical conditions.

On the other hand, polar polymers exist which are not conductive polymers, such as the fluorinated polymer homopolymers or copolymers termed "conventional", which are generally known for their heat-resistant properties and for their inertia towards chemical reagents. Some of these fluorinated polar polymers, such as the polymers derived from vinylidene fluoride, also have particular properties such as piezoelectricity, pyroelectricity, ferroelectricity and some dielectricity. Such properties, and in particular the ferroelectricity observed with the copolymers of vinylidene fluoride and vinylidene trifluoride, the Curie temperature of which is less than their melting point, have been described in U.S. Pat. No. 4,731,754 and have been used to make erasable memory optical disks.

The piezoelectric, pyroelectric, ferroelectric and dielectric levels obtained with such polymers are, however, relatively moderate and in all cases inherent to and issuing from the precise chemical nature of the polymer or the copolymers envisaged.

SUMMARY OF THE INVENTION

It has now been found that it is possible to increase the piezoelectric, pyroelectric, ferroelectric and/or dielectric values of these polymers if intimate mixtures are constructed of these polymers with dedoped "conductive" polymers. Moreover, these parameters may be modified quantitatively by arbitrarly modulating the ratios of the two types of polymers present in the mixtures.

The present invention therefore relates more particularly to mixtures of polymers known as "conductive" polymers and polar polymers, in which the conductive polymer is dedoped. Preferably, the "conductive" polymer is permanently dedoped. Under these conditions, the mixtures obtained have outstanding properties in respect of piezoelectric, pyroelectric, ferroelectric and dielectric effects, which can be turned to account in numerous fields, such as those of capacitors, detectors, actuators and also electrooptical modulators and commutators involving diverse optical interactions, in particular the KERR and POCKELS effects.

In fact, by virtue of the properties generated by dedoping the "conductive polymer" entity of the mixture of polymers envisaged, it becomes possible to create mixtures of polymers which have properties qualitatively and quantitatively different from the two types of individual polymers and to do so to a controllable extent.

Conductive polymers are understood to be any polymer possessing a conductivity which is introduced, by the transfer of electrons between the polymer chain and a reducing or oxidising doping agent or by an appropriate electrode, into the polymer chain by means of the presence of inorganic or organic ions which may be removed without affecting the base molecular structure of the polymer structure. Polymers of this type are, in particular, the polyacetylene, polypyrrole, polyindole, polyaniline, polyphenylene and polythiophene homopolymers or copolymers, the conductivity of which has been reduced by conventional dedoping or by any suitable procedure to a value below $10^{-4}$ S.cm$^{-1}$ and preferably below $10^{-6}$ S.cm$^{-1}$.

One category of conductive polymers which has given good results are the polythiophenes and more particularly polythiophenes possessing a side chain in the 3-position and/or the 4-position on the thiophene ring and optionally containing halogen atoms. "Conductive" polymers derived from polythiophenes containing a side chain in the 3-position on the thiophene ring are more particularly preferred.

In general, this side chain is an alkyl chain. Usually, it is a $C_1$ to $C_{12}$ alkyl chain which may optionally contain halogen atoms, such as chlorine or fluorine. Preferably, this side chain is a $C_1$ to $C_{10}$ alkyl chain which may optionally contain fluorine atoms. Particularly preferentially, the conductive polymers are polythiophenes such as poly(3-octylthiophene), poly(thienyl ethers) and poly(fluorothienyl ethers), such as poly(4-fluorobenzyl 2-(3'-thienyl)ethyl ether), and the polythiophenes which are described in French Patent Application No. 9109715, included by reference, and which are (fluorinated alkyl) 3-thienyl ether polymers.

Finally, good results have been obtained with 3-octylthiophene polymers, 4-fluorobenzyl 2-(3'-thienyl) ethyl ether polymers, 2,2,2-trifluoroethyl 3-thienyl ether polymers, 4,4,4,3,3,2,2-heptafluoro-n-butyl 3-thienyl ether polymers and 8,8,8,7,7,6,6,5,5,4,4,3,3,2,2-pentadecafluoro-n-octyl 3-thienyl ether polymers.

A polar polymer is understood to be any polymer in which the polymer molecules intrinsically have a dipolar moment. Industrial polymers of this type are, in particular, fluorinated polymers, polymethacrylates, polyvinyl acetates, polyvinyl chloride and their copolymers. Fluorinated polymers are preferably used. Particularly preferentially, the fluorinated polymers used are "conventional" homopolymers or copolymers such as the homopolymers or copolymers of vinylidene fluoride.

Preferred polymers of this type are the homopolymers of vinylidene fluoride, the copolymers of vinylidene fluoride and trifluoroethylene and the terpolymers based on vinylidene fluoride, trichloroethylene and chlorotrifluoroethylene. Good results have been obtained with the copolymer of vinylidene fluoride and trifluoroethylene (75/25).

The mixtures of "conductive" polymers and polar polymers are conceived on the basis of the chemical compatibility of the two types of polymers used. Thus, when the polar polymer is a "conventional" fluorinated homopolymer or copolymer, the polymers derived from thiophenes, Buch as poly(3-octylthiophene) or the fluorinated polythiophenes mentioned and preferred above, are preferably introduced as "conductive" partner. It is, however, obvious that the present invention is not restricted to particular mixtures of this type and that it also relates to other mixtures of polymers, the nature and the chemical compatibility of which may be determined by experiments known for this purpose.

The dedoping of the "conductive" polymer part, although essential in order to obtain the mixtures according to the invention, may be carried out by any known method and at any point in time insofar as the conductivity of the conducting entity is reduced to values at least below $10^{-3}S.cm^{-1}$. Thus, the dedoping of the "conductive" polymer may be carried out before the mixture of the two types of polymers is formed. In another embodiment, the dedoping of the "conductive" polymer is carried out after the mixture of the two types of polymers has been produced. One method which has given good results consists in dedoping the mixtures of polymers previously dissolved in a common solvent or suspended in a non-solvent. One method which has given good results consists in dedoping the "conductive" polymer before the mixture of the two types of polymers is formed; this dedoping may be effected by suspending the doped polymer in an alcohol, such as methanol, or in water, under an inert atmosphere, preferably under nitrogen, and with stirring.

The invention also relates to the processes for obtaining mixtures of the dedoped conductive polymers and polar polymers.

One process enabling the mixtures according to the invention to be obtained consists in carrying out the polymerisation of the "conductive" polymer by a chemical route in the presence of a polar polymer powder having a particle size which is dependent on the precise nature of the two polymers, in a liquid which is a non-solvent for the two types of polymers, in recovering the precipitated mixture of polymers by filtering off, in dissolving the precipitate obtained in a common solvent for the two polymers and in using the solution obtained.

A process of this type has given good results when it is applied to a mixture of a homopolymer of vinylidene fluoride in powder form introduced into a polymerisation medium based on 4-fluorobenzyl 2-(3'-thienyl)ethyl ether.

Another process enabling mixtures according to the invention to be obtained consists in carrying out the polymerisation of the "conductive" polymer on its own, in dedoping said polymer, then in mixing the dedoped "conductive" polymer and the polar polymer, in malaxating the mixture thus obtained and in using the latter.

The invention also relates to the use of mixtures of dedoped conductive polymers and polar polymers for the production of electronic, optoelectronic, electrical and electromechanical devices.

Depending on the applications, use is generally made of homogeneous, regular thin layers of variable surface area, the thickness of which may vary between 0.01 micron and 100 microns. The invention therefore also relates to the processes for obtaining thin films using mixtures of dedoped conductive polymers and polar polymers.

One process for the preparation of thin films which has given good results consists in dissolving and/or suspending the mixture of polar polymers and dedoped polymers in a common solvent and in spreading the soluble portion obtained, optionally through a serigraphic mask, on a support such as ordinary glass, Bilica or polyester and in spreading this solution with the aid of a doctor blade or a turntable, preferably in a laminar flow hood. The films thus obtained may be used either in the free form, that is to say detached from their support, or in the supported form, that is to say adhering to their support. These films may easily be metallised.

The free films may, in particular, be used in the production of dielectrics.

The mixtures of the invention and more particularly the films such as are obtained according to the method described may be used as such for their piezoelectric, pyroelectric, ferroelectric and dielectric properties or may be cowound, extruded or spread in one or more layers in order to construct devices in which these properties are utilised.

The mixtures according to the invention have surprising properties, such as, in particular, a high dielectric constant which is constant within a temperature range of 20° to 80° C. and for frequencies of 1 to 100 KHz.

The mixtures according to the invention are also used in the production of capacitors, which then have a high and constant dielectric constant.

DESCRIPTION OF THE PREFERRED EMBODIMENTS

The invention is illustrated by the examples below.

Example 1: Preparation of a mixture of Poly(vinylidene fluoride) and Poly(4-fluorobenzyl 2-(3'-thienyl)ethyl ether) (PThArF)

a. Preparation of Doly(4-fluorobenzyl 2-(3'-thienyl-ethyl ether)

A 4-necked 500 ml round-bottomed flask, fitted with a thermometer, a 3-way tap, a stirrer and a diaphragm permitting implantation therein of a needle connected to a metering syringe, kept at −25° C. by means of a thermostatic bath, is purged by a cycle comprising three applications of vacuum and three flushings with pure and dry nitrogen.

80 ml of acetonitrile and 0.65 g of poly(ethylene oxide) (Polyox WSRN 12K PEO) are introduced into this round-bottomed flask, which is kept under a nitrogen atmosphere, with stirring.

7 g of anhydrous $FeCl_3$ are then introduced, while continuing to stir the whole.

20 ml of acetonitrile in which 1 g of 4-fluorobenzyl 2-(3'thienyl)ethyl ether have been dissolved are then introduced into this mixture, via the metering syringe, in the course of 10 minutes.

Stirring of the round-bottomed flask is then continued at −25° C. for 5 hours.

A suspension containing 1 g of doped polymer per 100 ml of mixture is obtained.

b. Dedoping

While keeping the suspension as obtained above at −25° C. under nitrogen and continuing to stir, 50 ml of methanol are introduced slowly into the round-bottomed flask in the course of 40 minutes.

Stirring is then continued for 20 minutes and the mixture is then filtered through paper at 20° C. and under air.

The product obtained is washed 4 times with 50 ml of methanol and then dried under a vacuum of 20 Mm Hg at 20° C.

0.92 g of dedoped product (dedoped PThArF) which has a conductivity of between $10^{-6}$ and $10^{-7}$ S/cm is obtained.

c. Preparation of the mixture 10 g of poly(vinylidene fluoride) (PVDF) of mark SOLEF 1010 which are dissolved in 100 ml of dimethylformamide are introduced into a conical flask. The solution is kept well stirred at 20° C. for two hours.

Various solutions of 1 to 10% of dedoped product obtained (PThArF) in dimethylformamide are prepared. Stirring of the solution is continued for two hours at 20° C.

The mixture of these two solutions is produced by passing the dedoped PThArF solution dropwise and with good stirring into the PVDF solution in the proportions specified in Table I. Stirring is continued for one hour at 20° C.

d. Production of a film

The solution obtained above is spread on a glass support using a doctor blade of variable height (the height of the blade is varied using two micrometer screws).

A few cm³ of the solution are deposited in front of the doctor blade and it is moved at a speed of 10 cm per second.

The film obtained is placed to dry in a vacuum oven at 50° C. under 20 mm Hg for 30 minutes.

A 30 to 35 μm film is obtained which can be detached from the support and which has a conductivity of $10^{-10}$ to $10^{-12}$ S/cm.

e. Dielectric properties

The measurements of the dielectric constants and of the tangent of the loss angle tgδ at various temperatures and for frequencies of 1 to 100 KHz were carried out on thin films. The measurements were carried out on samples having a surface area of 6 cm² and metallised with a 500 Å layer of aluminum.

The samples are placed in a climatic chamber and measured using a measurement bridge (General Radio No. 1689 type).

The results are collated in Table 1.

TABLE 1

| No. | FILMS proportions | Thickness μm | Conductivity S/cm | ε at 20° C. 1 | 10 | 100 | tgδ at 20° C. 1 KHz | 10 | 100 KHz |
|---|---|---|---|---|---|---|---|---|---|
| 1 | PVDF | 32 | $2.8\ 10^{-12}$ | 5 | 5 | 5 | 0.015 | 0.020 | 0.06 |
| 2 | PVDF/PThArF 99/1 | 35 | $5.6\ 10^{-12}$ | 6 | 6 | 5.5 | 0.025 | 0.025 | 0.06 |
| 3 | PVDF/PThArF 90/10 | 30 | $2.3\ 10^{-11}$ | 7 | 6 | 5.5 | 0.090 | 0.070 | 0.060 |
| 4 | PVDF/PThArF 80/20 | 35 | $1.4\ 10^{-10}$ | 9 | 7 | 6 | 0.10 | 0.10 | 0.10 |
| 5 | PVDF/PThArf 75/25 | 35 | $6.7\ 10^{-12}$ | 18 | 12 | 8 | 0.25 | 0.25 | 0.25 |
| 6 | PVDF/PThArF 65/35 | 35 | $4.4\ 10^{-11}$ | 45 | 25 | 15 | 0.7 | 0.4 | 0.3 |
| 7 | PVDF/PThArF 50/50 | 35 | $5.0\ 10^{-11}$ | 90 | 45 | 25 | 0.80 | 0.50 | 0.40 |
| 8 | PThArF | 32 | $1.3\ 10^{-11}$ | 793 | 380 | 151 | 0.51 | 0.56 | 0.93 |

Example 2

An example comparable to that of Example 1 is carried out, but using 0.65 g of potassium perfluoroalkyl-sulphonate (FLUORAD FC 98) in place of the poly(ethylene oxide) and the copolymer VF2-TrFE (75/25), vinylidene fluoride and trifluoroethylene copolymer, in place of poly(vinylidene fluoride) (PVDF).

The results are collated in Table 2.

TABLE 2

| No. | FILMS proportions | Thickness μm | Conductivity S/cm | ε at 20° C. 1 | 10 | 100 KHz | tgδ at 20° C. 1 | 10 | 100 KHz |
|---|---|---|---|---|---|---|---|---|---|
| 1 | VF2-TrFE | 30 | $2.1\ 10^{-13}$ | 12 | 11 | 11 | 0.050 | 0.050 | 0.15 |
| 2 | VF2-TrFE/PThArF 99/1 | 35 | $3.5\ 10^{-11}$ | 8 | 8 | 7.5 | 0.025 | 0.040 | 0.090 |
| 3 | VF2-TrFe/PThArF 80/20 | 31 | $3.3\ 10^{-8}$ | 12 | 10 | 8 | 0.20 | 0.20 | 0.20 |
| 4 | VF2-TrFE/PThArF 75/25 | 35 | $3.3\ 10^{-7}$ | 38 | 30 | 25 | 0.25 | 0.15 | 0.15 |
|  | VF2-TrFE/PThArF 65/35 | 35 | $3.3\ 10^{-7}$ | 63 | 53 | 40 | 0.35 | 0.30 | 0.20 |

Example 3 a. Polymerisation of poly (3-octylthiophene) (POTH)

The reactor used is a 5-necked 3 l round-bottomed flask fitted, respectively, with a 3-way tap, a thermometer, a 250 ml reservoir having a tap, surmounted by a 3-way tap, a diaphragm permitting implantation of a needle connected to a 50 ml metering syringe, and a stirrer.

This round-bottomed flask, fitted with its stirrer, is placed in a thermostatic bath and is purged by a cycle comprising 3 applications of vacuum and 3 fillings with pure and dry nitrogen.

850 ml of chloroform previously degassed with nitrogen are introduced into this round-bottomed flask, which is kept at 5° C. under nitrogen, and 94 g of anhydrous ferric chloride are then added, with stirring.

The metering syringe is then filled with 20 ml of demineralised and degassed water and the reservoir having a tap is then filled with 150 ml of chloroform and 11 g of distilled and degassed 3-n-octylthiophene.

Using the syringe, the water and, using the reservoir having a tap, the chloroform and the 3-n-octylthiophene are introduced in parallel into the round-bottomed flask in the course of 10 minutes.

Stirring of the round-bottomed flask is then continued at 5° C. for two hours. A suspension containing 12 g of doped polymer per 1020 ml of mixture is obtained.

b. Dedoping

While keeping the suspension described above at 5° C. under nitrogen and continuing to stir, 200 ml of methanol are introduced in the course of 40 minutes.

Stirring is continued for 20 minutes and the mixture is then filtered through paper at 20° C. and under air.

The product obtained is washed 3 times with 200 ml of methanol at 20° C. and is then washed once with 200 ml of methanol, at elevated temperature and under reflux, for 2 hours in a 500 ml round-bottomed flask surmounted by a condenser.

The procedure is completed by washing with 200 ml of methanol at 20° C. and the product is then filtered off and dried under a vacuum of 20 mm Hg at 20° C.

9 g of dedoped product which has a conductivity of $10^{-7}$ to $10^{-8}$ S/cm are obtained.

C. Preparation of the mixture 10 g of poly(vinylidene fluoride) (PVDF) of the mark SOLEF 1010 and 100 ml of dimethylformamide are introduced into a conical flask.

The solution obtained is kept well stirred at 20° C. for 2 hours.

A 1% solution of POTH in chloroform is prepared. Stirring of the solution is continued for 2 hours. The solution is then filtered through paper and concentrated 20-fold in a rotary evaporator.

The mixture of these two solutions is produced by passing the POTH solution dropwise into the well-stirred PVDF solution in the proportions specified in Tables 3 and 4. Stirring is continued for 1 hour at 20° C.

d. Production of a film or a sheet

1) Production of a film

The solution obtained above is spread on a glass support using a doctor blade of variable height (the height of the blade is varied using two micrometer screws).

A few cm$^3$ of the solution are deposited in front of the doctor blade and it is moved at a speed of 10 cm per second.

The film obtained is dried in a vacuum oven at 20° C. under 20 mm Hg for 30 minutes.

A 30 to 35 μm film is obtained which may be detached from the support and which has a conductivity of $10^{-10}$ to $10^{-12}$ S/cm.

2) Production of a sheet

Poly (vinylidene fluoride) (PVDF) of the mark SOLEF 1010 and poly (3-octylthiophene) (POTH) polymers in powder form are mixed mechanically with one another in accordance with the desired ratios.

The mixtures of powders thus obtained are then malaxated in a micromixer at 180° C. for 2 minutes. The mixture obtained is pressed between two stainless steel plates at 180° C. and 200 kg per cm$^2$ for 3 minutes (one minute preheating under 50 kg per cm$^2$ and 2 minutes under 200 kg per cm$^2$). The whole is then cooled rapidly (within about one minute). A sheet 120 to 150 μm thick is thus obtained.

e. Dielectric properties

The measurements of the dielectric constants ε and of the tangent of the loss angle tgδ at various temperatures and for frequencies of 1 to 100 KHz were carried out either on thin films or on sheets. In the case of the films, the measurements were carried out on samples having a surface area of 6 cm$^2$, metallised with a 500 Å layer of aluminium. In the case of the sheets, the measurements were carried out on 10 cm$^2$ samples placed between two aluminium electrodes.

The samples are placed in a climatic chamber and measured using a measurement bridge (General Radio No. 1689 type).

The results are collated in Table 3 for the films and in Table 4 for the sheets.

TABLE 3

| No. | FILMS proportions | Thickness μm | Conductivity S/cm | ε at 20° C. 1 | 10 | 100 KHz | tgδ at 20° C. 1 | 10 | 100 KHz |
|---|---|---|---|---|---|---|---|---|---|
| 1 | PVDF | 32 | 2.8 $10^{-12}$ | 5 | 5 | 5 | 0.015 | 0.020 | 0.050 |
| 2 | PVDF/POTh 99/1 | 30 | 2.3 $10^{-12}$ | 6 | 6 | 5.5 | 0.025 | 0.30 | 0.70 |
| 3 | PVDF/POTh 90/10 | 30 | 2.1 $10^{-14}$ | 8 | 7 | 6 | 0.050 | 0.080 | 0.10 |
| 4 | POTh | 30 | 7.9 $10^{-8}$ | 150 | 70 | 25 | 1 | >1 | >1 |

TABLE 4

| No. | SHEETS proportions | Thickness μm | Conductivity S/cm | ε at 20° C. 1 | 10 | 100 KHz | tgδ at 20° C. 1 | 10 | 100 KHz |
|---|---|---|---|---|---|---|---|---|---|
| 1 | PVDF | 120 | 2.8 $10^{-12}$ | 7.5 | 7.5 | 7 | 0.15 | 0.290 | 0.10 |
| 2 | PVDF/POTh 99/1 | 135 | 1.9 $10^{-12}$ | 10 | 10 | 9 | 0.025 | 0.030 | 0.10 |
| 3 | PVDF/POTh 90/10 | 135 | 2.8 $10^{-7}$ | 21 | 15 | 12 | 0.40 | 0.20 | 0.20 |
| 4 | PVDF/POTh 80/20 | 130 | 4 $10^{-8}$ | 22 | 18 | 12 | 0.25 | 0.20 | 0.15 |

Example 4

An example comparable to that of Example 3 is carried out, but using the copolymer VF2-TrFE (75/25), a copolymer of vinylidene fluoride and trifluoroethylene, instead of poly(vinylidene fluoride).

The results are collated in Table 5 for the films and in Table 6 for the sheets.

TABLE 5

| No. | FILMS proportions | Thickness μm | Conductivity S/cm | ε at 20° C. 1 | 10 | 100 KHz | tgδ at 20° C. 1 | 10 | 100 KHz |
|---|---|---|---|---|---|---|---|---|---|
| 4 | POTh | 30 | 7.9 $10^{-8}$ | 150 | 70 | 25 | 1 | >1 | >1 |
| 1 | VF2-TrFE | 30 | 2.1 $10^{-13}$ | 8 | 8 | 8 | 0.020 | 0.030 | 0.15 |

TABLE 5-continued

| FILMS | | Thickness | Conductivity | ε at 20° C. | | | tgδ at 20° C. | | |
|---|---|---|---|---|---|---|---|---|---|
| No. | proportions | μm | S/cm | 1 | 10 | 100 KHz | 1 | 10 | 100 KHz |
| 2 | VF2-TrFE/POTh 99/1 | 30 | $5.6 \cdot 10^{-11}$ | 9 | 8 | 7 | 0.030 | 0.040 | 0.15 |
| 3 | VF2-TrFE/POTh 90/10 | 30 | $5 \cdot 10^{-12}$ | 10 | 9.5 | 9 | 0.10 | 0.15 | 0.10 |

TABLE 6

| SHEETS | | Thickness | Conductivity | ε at 20° C. | | | tgδ at 20° C. | | |
|---|---|---|---|---|---|---|---|---|---|
| No. | proportions | μm | S/cm | 1 | 10 | 100 KHz | 1 | 10 | 100 KHz |
| 1 | VF2-TrFE | 120 | $2.1 \cdot 10^{-13}$ | 6 | 6 | 6 | 0.050 | 0.050 | 0.050 |
| 2 | VF2-TrFE/POTh 99/1 | 120 | $3.7 \cdot 10^{-10}$ | 9 | 8 | 7 | 0.040 | 0.040 | 0.10 |
| 3 | VF2-TrFE/POTh 90/10 | 130 | $1 \cdot 10^{-11}$ | 10 | 7 | 6 | 0.20 | 0.15 | 0.15 |
| 4 | VF2-TrFE/POTh 80/20 | 130 | $2 \cdot 10^{-11}$ | 20 | 9 | 6 | 0.65 | 0.30 | 0.30 |

Example 5 a. Polymerisation of 2,2,2-trifluoroethyl 3-thienyl ether (PTHOF)

The reactor used is a 500 ml round-bottomed flask fitted with a three-way tap, a stirrer and a diaphragm permitting implantation therein of a needle connected to a metering pump.

The round-bottomed flask is purged by means of a cycle comprising three applications of vacuum and three flushings with pure and dry nitrogen.

80 ml of chloroform and 22 g of anhydrous ferric chloride are introduced into this round-bottomed flask, which is kept at −20° C. under nitrogen, the whole being stirred. 20 ml of chloroform and 2.5 g of 2,2,2-trifluoroethyl 3-thienyl ether are then introduced in to the mixture, via the metering pump, the whole in the course of 10 minutes.

Stirring of the round-bottomed flask is continued at −20° C. for two hours.

A suspension containing 2.5 g of doped polymer per 100 ml of mixture is obtained.

b. Dedoping

While keeping the suspension as obtained above at −20° C. under nitrogen and continuing to stir, 50 ml of water are introduced slowly into the round-bottomed flask in the course of 20 minutes.

Stirring is then continued for 20 minutes and the mixture is then filtered through paper at 20° C. and under air.

The product obtained is washed 4 times with 50 ml of water and then dried under a vacuum of 20 Mm Hg at 20° C.

2.1 g of dedoped polymer which has a conductivity of the order of $10^{-6}$ S/cm are obtained.

c. Preparation of the mixture

A solution of 10 g of poly (vinylidene fluoride) (PVDF) of the mark SOLEF 1010 in 100 ml of dimethylformamide is introduced into a conical flask. The solution is kept well stirred at 20° C. for two hours.

A 5% solution of the dedoped polymer as obtained above in dimethylformamide is prepared. The solution is kept well stirred at 20° C. for two hours.

The mixture of the two solutions, in the desired ratio, is produced by passing the solution of the dedoped polymer PTHOF dropwise into the well-stirred PVDF solution. Stirring is continued for one hour at 20° C.

d. Production of a film

The solution obtained above is spread on a glass support using a doctor blade of variable height. The height of the blade is fixed using two micrometer screws. A few cm³ of the solution are deposited in front of the doctor blade and it is moved at a speed of 10 cm per second.

The film obtained is placed to dry in a vacuum oven at 50° C. under 20 mm Hg for 30 minutes.

A 30 to 35 μm film is obtained which may be detached from the support and which has a conductivity of $10^{-7}$ to $10^{-13}$ S/cm.

e. Dielectric properties

The measurements of the dielectric constants ε and of the tangent of the loss angle, tgδ, at various temperatures and for frequencies of 1 to 100 KHz were carried out on the films described above. The measurements were carried out on samples having a surface area of 6 cm², metallised by a 500 Å layer of aluminium.

The samples are placed in a climatic chamber and the measurements are carried out using a measurement bridge (General Radio No. 1689 type).

The results are collated in Table 7.

TABLE 7

| FILMS | | Thickness | Conductivity | ε at 20° C. | | | tgδ at 20° C. | | |
|---|---|---|---|---|---|---|---|---|---|
| No. | proportions | μm | S/cm | 1 | 10 | 100 KHz | 1 | 10 KHz | 100 |
| 1 | PVDF | 32 | $2.8 \cdot 10^{-12}$ | 5 | 5 | 5 | 0.01 | 0.02 | 0.06 |
| 2 | PVDF/PTHOF 99/1 | 30 | $5.0 \cdot 10^{-10}$ | 7.5 | 7 | 7 | 0.04 | 0.04 | 0.06 |
| 3 | PVDF/PTHOF 90/10 | 35 | $1.0 \cdot 10^{-9}$ | 15 | 12 | 9 | 0.02 | 0.02 | 0.02 |
| 4 | PVDF/PTHOF 80/20 | 35 | $1.0 \cdot 10^{-7}$ | 32 | 17 | 10 | 0.60 | 0.40 | 0.35 |
| 5 | PVDF/PTHOF 75/25 | 30 | $2.0 \cdot 10^{-7}$ | 30 | 15 | 9 | 0.80 | 0.40 | 0.35 |
| 6 | PVDF/PTHOF 65/35 | 30 | $5.0 \cdot 10^{-7}$ | 60 | 23 | 12 | 3.2 | 1.2 | 0.50 |

Example 6

An example comparable to that of Example 5 is carried out, but using the copolymer VF2-TrFE (75/25), a copolymer of vinylidene fluoride and trifluoroethylene, instead of poly(vinylidene fluoride) (PVDF).

The results are collated in Table 8. The results obtained with mixture No. 8 (VF2-TrFE/PTHOF: 20/80) are illustrated in FIGS. 1, 2 and 3.

BRIEF DESCRIPTION OF THE DRAWINGS

FIG. 2 shows the tangent of the loss angle tg$\delta$ as a function of the temperature, which measurements were carried out for 3 frequencies: 1, 10 and 100 KHz.

FIG. 3 shows the measurements of the dielectric constant $\epsilon$ as a function of the temperature, which measurements were carried out for the frequency of 100 KHz.

Figure 1:
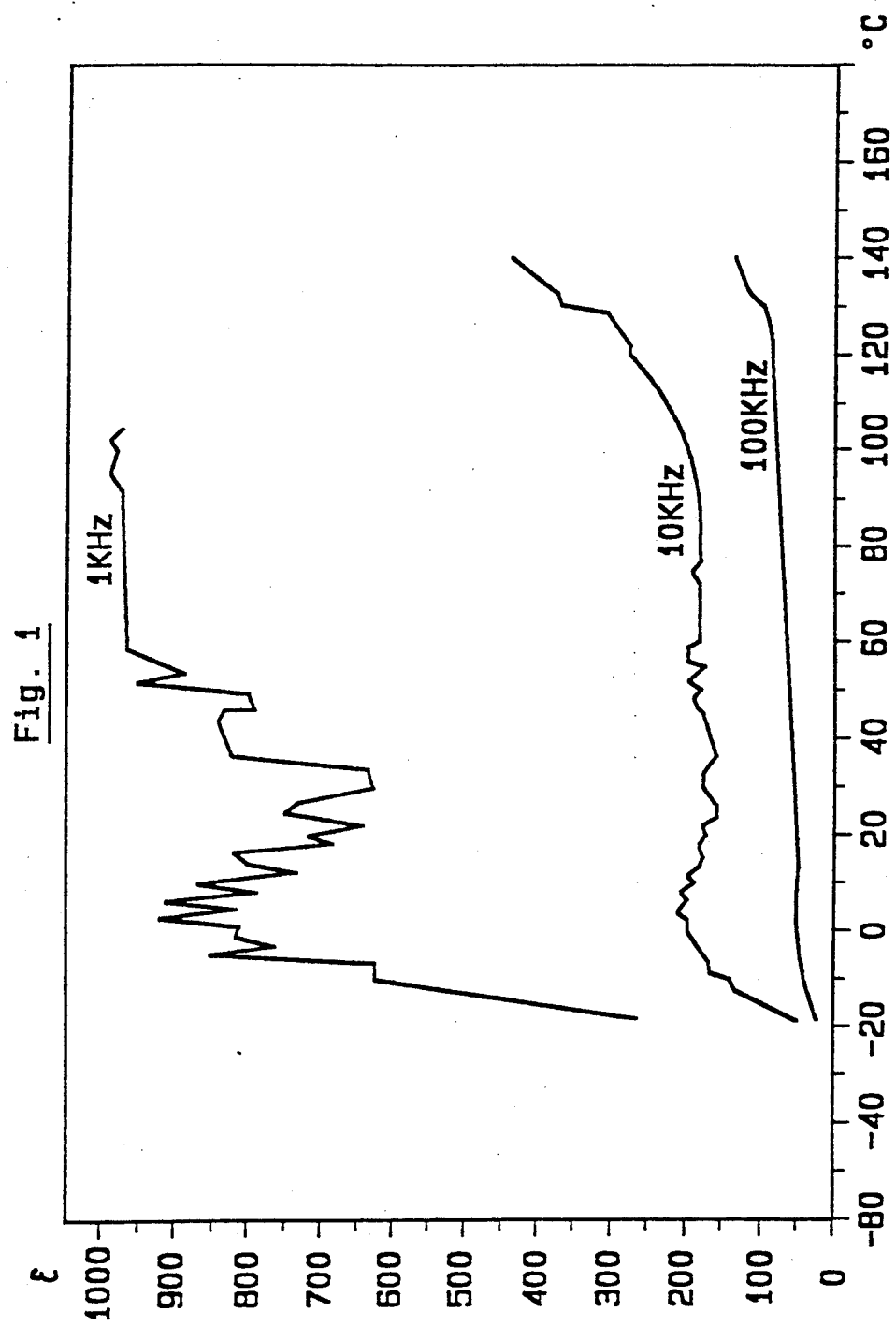
FIG. 1 shows the measurements of the dielectric constant $\epsilon$ as a function of the temperature, which measurements were carried out for 3 frequencies: 1, 10 and 100 KHz.

In these three figures, the abscibsa unit is the temperature in °C.

In FIGS. 1 and 3, the ordinate unit is the dielectric constant.

In FIG. 2, the ordinate unit is the tangent of the angle.

TABLE 8

| FILMS | | Thickness | Conductivity | $\epsilon$ at 20° C. | | | tg$\delta$ at 20° C. | | |
|---|---|---|---|---|---|---|---|---|---|
| No. | proportions | $\mu$m | S/cm | 1 | 10 | 100 KHz | 1 | 10 | 100 KHz |
| 1 | VF2-TrFE | 30 | $2.1\ 10^{-13}$ | 12 | 11 | 11 | 0.05 | 0.05 | 0.15 |
| 2 | VF2-TrFE/PTHOF 99/1 | 30 | $3.0\ 10^{-12}$ | 8 | 10 | 11 | 0.05 | 0.06 | 0.15 |
| 3 | VF2-TrFE/PTHOF 90/10 | 30 | $1.1\ 10^{-11}$ | 7 | 8 | 9 | 0.04 | 0.06 | 0.15 |
| 4 | VF2-TrFE/PTHOF 80/20 | 30 | $5.3\ 10^{-10}$ | 500 | 35 | 18 | 2.8 | 4.5 | 1.0 |
| 5 | VF2-TrFE/PTHOF 75/25 | 30 | $2.8\ 10^{-10}$ | 950 | 50 | 20 | 2.1 | 5.5 | 1.5 |
| 6 | VF2-TrFE/PTHOF 65/35 | 30 | $6.8\ 10^{-10}$ | >1000 | 350 | 30 | 0.8 | 3.5 | 5.3 |
| 7 | VF2-TrFE/PTHOF 50/50 | 30 | $3.1\ 10^{-9}$ | >1000 | 480 | 110 | 0.7 | 1.5 | 2.0 |
| 8 | VF2-TrFE/PTHOF 20/80 | 30 | $5.0\ 10^{-9}$ | 700 | 150 | 40 | 2.2 | 1.5 | 1.5 |

$\epsilon$: dielectric constant
tg$\delta$: tangent of the loss angle fluorobenzyl 2-(3'-thienyl)ethyl ether) and a vinylidene fluoride homopolymer or copolymer.

6. The polymer mixture according to claim 1, wherein the at least one dedoped conductive polymer is a polythiophene.

7. The polymer mixture according to claim 6, wherein the polythiophene has a thiophene ring which has a side chain thereon.

8. The polymer mixture according to claim 7, wherein the polythiophene is selected from the group consisting of 3-octylthiophene polymers, 2,2,2-trifluoroethyl 3-thienyl ether polymers, 4,4,4,3,3,2,2,-heptafluoro-n-butyl 3-thienyl ether polymers, and 8,8,8,7,7,6,6,5,5,4,4,3,3,2,2-pentadecafluoro-n-octyl 3-thienyl ether polymers.

9. The polymer mixture according to claim 1, wherein the at least one dedoped conductive polymer has a conductivity of less than $10^{-4}$ S.cm$^{-1}$.

10. The polymer mixture according to claim 1, wherein the at least one dedoped conductive polymer has a conductivity of less than $10^{-6}$ S.cm$^{-1}$.

11. A process for obtaining a polymer mixture according to claim 1, comprising:

What is claimed is:

1. A polymer mixture, comprising:
   at least one conductive polymer which has been dedoped to provide at least one dedoped conductive polymer having a conductivity of less than $10^{-3}$ S.cm$^{-1}$ and which is a homopolymer or copolymer selected from the group consisting of a polyacetylene, a polypyrrole, a polyindole, a polyaniline, a polyphenylene, and a polythiophene; and
   at least one polar polymer.

2. The polymer mixture according to claim 1, wherein the at least one polar polymer is a homopolymer or copolymer selected from the group consisting of a fluorinated polymer, a polymethacrylate, a polyvinyl acetate, and a polyvinyl chloride.

3. The polymer mixture according to claim 2, wherein the at least one polar polymer is a fluorinated polymer.

4. The polymer mixture according to claim 2, wherein the at least one polar polymer is selected from the group consisting of a homopolymer and a copolymer of vinylidene fluoride.

5. The polymer mixture according to claim 4, wherein the polymer mixture contains dedoped poly(4- a. providing at least one polar polymer in powdered form;

b. providing at least one conductive polymer by a chemical route in the presence of the at least one polar polymer and in a liquid which is a non-solvent for the at least one conductive polymer and the at least one polar polymer to provide a polymer mixture which is a precipitate;

c. recovering the precipitate by filtration;

d. dissolving the precipitate of step (c) in a solvent which is a common solvent for the at least one conductive polymer and the at least one polar polymer; and e. dedoping the at least one conductive polymer in one of the non-solvent of step (b) or the common solvent of step (d) to provide at least one dedoped conductive polymer.

12. A process for obtaining a polymer mixture according to claim 1, comprising:

a. providing at least one conductive polymer by a chemical route;

b. dedoping the at least one conductive polymer to provide at least one dedoped conductive polymer;

c. mixing at least one polar polymer with the at least one dedoped conductive polymer of step (b); and d. malaxating the mixture.

* * * * *